（12） United States Patent
Stacy et al.

(10) Patent No.: US 7,411,957 B2
(45) Date of Patent: Aug. 12, 2008

(54) HARDWARE FILTERING SUPPORT FOR DENIAL-OF-SERVICE ATTACKS

(75) Inventors: John Kenneth Stacy, Cary, NC (US); Trevor Garner, Apex, NC (US); Martin W. Hughes, Cary, NC (US); William R. Lee, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 10/811,195

(22) Filed: Mar. 26, 2004

(65) Prior Publication Data

US 2005/0213570 A1 Sep. 29, 2005

(51) Int. Cl.
*H04L 12/28* (2006.01)
*G06F 11/30* (2006.01)

(52) U.S. Cl. ............................. 370/392; 713/181
(58) Field of Classification Search .............. None
See application file for complete search history.

(56) References Cited

U.S. PATENT DOCUMENTS

| | | | |
|---|---|---|---|
| 6,301,668 B1 | 10/2001 | Gleichauf et al. | |
| 6,430,183 B1* | 8/2002 | Satran et al. | 370/389 |
| 6,499,107 B1 | 12/2002 | Gleichauf et al. | |
| 6,522,188 B1* | 2/2003 | Poole | 327/407 |
| 6,578,147 B1 | 6/2003 | Shanklin et al. | |
| 6,657,742 B1* | 12/2003 | Kassmann | 358/1.15 |
| 6,714,553 B1* | 3/2004 | Poole et al. | 370/412 |
| 6,738,814 B1 | 5/2004 | Cox et al. | |
| 6,754,662 B1* | 6/2004 | Li | 707/101 |
| 6,792,546 B1 | 9/2004 | Shanklin et al. | |
| 6,816,973 B1 | 11/2004 | Gleichauf et al. | |
| 6,950,434 B1* | 9/2005 | Viswanath et al. | 370/392 |
| 2003/0115485 A1* | 6/2003 | Milliken | 713/201 |
| 2004/0064737 A1* | 4/2004 | Milliken et al. | 713/201 |
| 2004/0107285 A1* | 6/2004 | Larson et al. | 709/229 |
| 2004/0199630 A1* | 10/2004 | Sarkissian et al. | 709/224 |
| 2007/0204344 A1 | 8/2007 | Xue et al. | |
| 2007/0245417 A1 | 10/2007 | Lee et al. | |
| 2007/0261112 A1 | 11/2007 | Todd et al. | |
| 2008/0028467 A1 | 1/2008 | Kommareddy et al. | |

OTHER PUBLICATIONS

U.S. Appl. No. 10/657,497, filed Sep. 8, 2003 by Garner et al., entitled Header Check Hash Circuit.
U.S. Appl. No. 10/769,941, filed Feb. 2, 2004 by Hughes et al., entitled Memory Efficient Hashing Algorithm.

(Continued)

*Primary Examiner*—Andrew C. Lee
(74) *Attorney, Agent, or Firm*—Cesari and McKenna, LLP

(57) ABSTRACT

A system and method is provided for automatically identifying and removing malicious data packets, such as denial-of-service (DoS) packets, in an intermediate network node before the packets can be forwarded to a central processing unit (CPU) in the node. The CPU's processing bandwidth is therefore not consumed identifying and removing the malicious packets from the system memory. As such, processing of the malicious packets is essentially "off-loaded" from the CPU, thereby enabling the CPU to process non-malicious packets in a more efficient manner. Unlike prior implementations, the invention identifies malicious packets having complex encapsulations that can not be identified using traditional techniques, such as ternary content addressable memories (TCAM) or lookup tables.

25 Claims, 8 Drawing Sheets

OTHER PUBLICATIONS

Perlman, Radia, Interconnections Second Edition: Bridges, Routers, Switches, and Internetworking Protocols, Addison Wesley, 1999, Section 1.1, pp. 1-7.

PCT Notification of Transmittal of the International Search Report and the Written Opinion of the International Searching Authority, or the Declaration, International Appl. No.: PCT/US05/07059, International Filing Date: Mar. 3, 2005, Date of Mailing: Feb. 6, 2008, 7 pages.

* cited by examiner

HARDWARE FILTERING SUPPORT FOR DENIAL-OF-SERVICE ATTACKS

RELATED APPLICATIONS

This application is related to U.S. patent application Ser. No. 10/657,497, entitled HEADER RANGE CHECK HASH CIRCUIT, by Trevor Garner, et al., the teachings of which are expressly incorporated herein by reference.

This application is related to U.S. patent application Ser. No. 10/769,941, entitled MEMORY EFFICIENT HASHING ALGORITHM, by Martin Hughes, et al., the teachings of which are expressly incorporated herein by reference.

FIELD OF THE INVENTION

This invention relates generally to network communications, and, more specifically, to a system and method for filtering denial-of-service traffic in an intermediate network node, such as a router.

BACKGROUND OF THE INVENTION

A computer network is a geographically distributed collection of interconnected subnetworks for transporting data between nodes, such as computers. A local area network (LAN) is an example of such a subnetwork. The network's topology is defined by an arrangement of client nodes that communicate with one another, typically through one or more intermediate network nodes, such as a router or switch. As used herein, a client node is an endstation node that is configured to originate or terminate communications over the network. In contrast, an intermediate network node is a node that facilitates routing data between client nodes. Communications between nodes are typically effected by exchanging discrete packets of data according to predefined protocols. In this context, a protocol consists of a set of rules defining how the nodes interact with each other.

Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include at least a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information for transmitting the packet over a particular physical link (i.e., a communication medium), such as a point-to-point link, Ethernet link, wireless link, optical link, etc. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the packet's logical path (or "virtual circuit") through the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the client node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination nodes. More specifically, the packet is generated in the source node by the application assigned to the source port number. Then, the packet is forwarded to the destination node and directed to the application assigned to the destination port number. The transport header also may include error-checking information (i.e., a checksum) and other data-flow control information. For instance, in connection-oriented transport protocols such as the Transmission Control Protocol (TCP), the transport header may store sequencing information that indicates the packet's relative position in a transmitted stream of data packets.

As used herein, a dataflow is a stream of data packets that is communicated from a source node to a destination node. Each packet in the flow satisfies a set of predetermined criteria, e.g., based on the packet's contents, size or relative position (i.e., temporal or spatial) in the data flow. An intermediate network node may be configured to perform "flow-based" routing operations so as to route each packet in a data flow in the same manner. The intermediate node typically receives data packets in the flow and forwards the packets in accordance with predetermined routing information that is distributed using a protocol, such as the Open Shortest Path First (OSPF) protocol. Because each packet in the flow is addressed to the same destination node, the intermediate node need only perform one forwarding decision for the entire data flow, e.g., based on the first packet received in the flow. Thereafter, the intermediate node forwards packets in the data flow based on the flow's previously determined routing information (i.e., adjacency information). In this way, the intermediate node consumes fewer resources, such as processor bandwidth and processing time, than if it performed a separate forwarding decision for every packet in the data flow.

In practice, the intermediate network node may implement a hash table which stores packet-related information used to classify received packets into their corresponding data flows. The hash table is typically organized as a table of linked lists, where each list may be indexed by the result of applying a conventional hash function to "signature" information. In this context, a signature is a set of values that remain constant for every packet in a data flow. For example, assume each packet in a first data flow stores the same pair of source and destination IP address values. In this case, a signature for the first data flow may be generated based on the values of these source and destination IP addresses. Likewise, a different signature may be generated for a second data flow whose packets store a different set of source and destination IP addresses than packets in the first data flow. Of course, those skilled in the art will appreciate that a data flow's signature information is not limited to IP addresses and may include other information, such as TCP port numbers, IP version numbers and so forth.

Each linked list in the hash table contains one or more entries, and each linked-list entry stores information corresponding to a particular data flow. Such information may include, inter alia, the data flow's associated signature information and a data-flow identifier ("flow ID"). The flow ID identifies the particular data flow and also may be used to locate routing information associated with the data flow. To that end, the intermediate network node may maintain a data structure that maps flow ID values to the memory locations of their corresponding routing information, e.g., stored in the node's local or internal memory. Alternatively, the flow ID values may directly incorporate the memory locations of their data flows' routing information.

When a packet is received by the intermediate network node, signature information is extracted from the packet's network headers and hashed using a conventional hash function, such as a cyclic redundancy check (CRC) function. The resultant hash value is used to index a hash-table entry which, in turn, references a linked list. Entries in the linked list are accessed sequentially until a "matching" entry is found storing the extracted signature. When a matching linked-list entry is located, the entry's stored flow ID value is used to associate the received packet with a data flow and the packet is routed in accordance with that flow.

The intermediate network node typically receives a large number of data flows from various sources, including client nodes and other intermediate nodes. Each source may be responsible for establishing one or more data flows with the intermediate node. To optimize use of its processing bandwidth, the intermediate node may process the received flows on a prioritized basis. That is, as packets are received at the intermediate node, they are identified as belonging to, e.g., a high or low priority data flow. Packets in the high-priority flow may be processed by the intermediate node in advance of the low-priority packets, even if the low-priority packets were received before the high-priority packets.

Denial-of-service (DoS) attacks have become fairly common techniques for disabling access to resources and/or services in an intermediate network node. A DoS attack corresponds to a data flow of "malicious" packets which, when processed by the intermediate network node, deprive non-malicious packets (i.e., non-DoS packets) access to certain resources and/or services in the node. The DoS packets may be sent from a single source or may be coordinated among a plurality of sources. This latter case is often referred to as a distributed DoS (DDOS) attack. For example, a computer hacker may launch a DDoS attack through a multitude of compromised endstations that transmit data packets to a target intermediate node, thereby overwhelming the intermediate node's processing bandwidth.

DoS attacks typically involve sending large quantities of a specific type of network traffic, such as packets formatted in accordance with the Internet Control Message Protocol (ICMP) or the Internet Group Management Protocol (IGMP), to the intermediate network node. In many cases, the DoS packets are pre-pended by a complex arrangement of network headers. Thus, the targeted intermediate network node becomes overburdened not only by the large quantity of received DoS packets, but also by the consumption of resources required to process them. Since the intermediate node's resources become overly consumed processing these malicious packets, other non-malicious packets sent to the intermediate node are often dropped or discarded. Accordingly, different types of intermediate network nodes attempt to prevent DoS attacks in various ways.

The high-end "core" routers and switches typically have enough processing bandwidth to process both malicious DoS packets as well as non-malicious packets. In this context, the high-end routers and switches are designed to handle large amounts of network traffic, e.g., on a network "backbone." Consequently, the malicious packets can be processed at the rate at which they are received, i.e., at "line" rate. These high-end intermediate nodes thus rely primarily on hardware forwarding solutions that cannot become over-subscribed while identifying and removing the malicious DoS packets. As a result, a substantial portion of processing bandwidth in the central processing unit(s) (CPU) executing the software may be consumed identifying and removing DoS packets. Another disadvantage of this solution is that the routing or switching software becomes more complex by the inclusion of code for filtering the DoS packets from the received data flows.

The "mid-range" routers and switches, unlike their high-end counterparts, typically become oversubscribed as a result of a DoS attack. These intermediate nodes are usually enterprise or LAN routers/switches that manage a relatively large number of data flows. In order to identify and remove DoS traffic (i.e., data packets), the mid-range routers and switches typically utilize software executing on a centralized CPU or on a network processor supporting a general-purpose CPU. Like the software in the high-end routers and switches, the software in the mid-range routers and switches consumes an excessive amount of processing bandwidth and complexity for thwarting the DoS attack.

Hardware support for prioritization of ingress traffic is sometimes implemented in the mid-range routers and switches when the "problem" DoS traffic can be filtered and put on a low-priority queue serviced by the software. However, because the number of malicious packets typically becomes exorbitant during the DoS attack, the low-priority queue usually fills and is therefore tail-dropped, dropping both the malicious DoS traffic as well as non-malicious low-priority traffic. Furthermore, the hardware filtering is typically implemented as a simple table lookup on data link (layer 2) or internetwork (layer 3) information contained in the received data packets. The table lookup may be performed using a content addressable memory (CAM), such as a ternary CAM (TCAM). If the DoS attack traffic arrives via a complicated encapsulation, this table-based filtering cannot support these encapsulations and the DoS traffic is then forwarded to the software executing on the CPU. As a result, the hardware support does not prevent the CPU from being burdened with processing the DoS traffic.

The low-end "access" routers and switches are typically single CPU systems that process a relatively small amount of network traffic and are therefore more susceptible to a DoS attack than the above-noted mid-range and high-end intermediate network nodes. There is only one CPU in the low-end routers and switches, so CPU bandwidth is typically not consumed pre-processing or prioritizing in-coming data packets. Such preprocessing would require the software executing on the CPU to process each received packet twice (prioritize and route) thus consuming an unacceptable amount of processing resources. Therefore, the low-end routers and switches usually only filter received data packets (if at all) using simple lookup tables or TCAMs that are not able to identify complex DoS packet encapsulations.

There is generally a need for an intermediate network node that can identify and remove DoS traffic without consuming an excessive amount of processing resources or bandwidth in the node. Further, the intermediate node should identify and remove DoS traffic having encapsulations of any arbitrary complexity. In addition, the malicious DoS packets should be removed from the intermediate node without affecting the processing of non-malicious packets, such as low-priority non-malicious packets.

SUMMARY OF THE INVENTION

The present invention overcomes the disadvantages of the prior art by providing a system and method for automatically identifying and removing malicious data packets, such as denial-of-service (DoS) packets, in an intermediate network node before the packets can be forwarded to a central processing unit (CPU) in the node. The CPU's processing bandwidth is therefore not consumed identifying and removing the malicious packets from the system memory. As such, processing of the malicious packets is essentially "off-loaded" from the CPU, thereby enabling the CPU to process non-malicious packets in a more efficient manner. Unlike prior implementations, the invention identifies malicious packets having complex encapsulations that can not be identified using traditional techniques, such as TCAMs or lookup tables.

Advantageously, the invention may be employed in an intermediate network node configured to perform as a high-end, mid-range or access router. Further, the invention may be used in conjunction with conventional access control lists (ACL) and/or intrusion detection systems (IDS) in order to delete DoS traffic whose encapsulations are too complex to be filtered by the ACL or IDS. More generally, the invention may be configured, either automatically or manually, to filter malicious packets having encapsulations of any arbitrary complexity. The malicious data packets are preferably identified using hash-based flow identification, although other flow classification techniques may be employed. The invention is illustratively implemented in a hardware assist device in the intermediate network node. However, it is also expressly contemplated that the invention may be embodied by other combinations of hardware and/or software.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
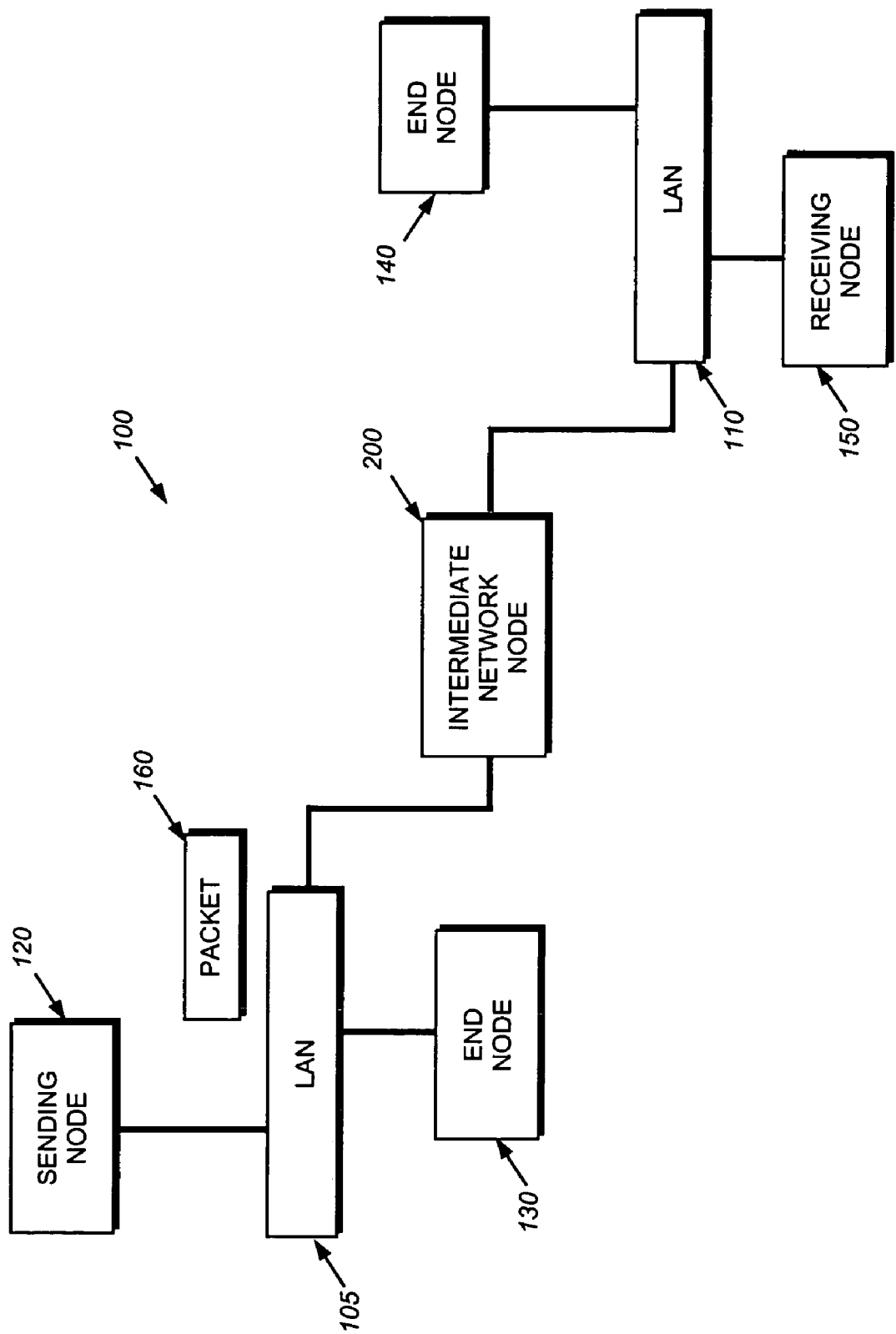
FIG. 1 is a schematic block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and internetwork headers, as the data passes through different layers of a protocol stack. The packet is then transmitted over the network to the intermediate node 200 which facilitates the flow of the data packet through the network by routing it to the proper receiving node 150. Specifically, the node 200 receives the packet at one of its network interfaces and renders a forwarding decision for the packet based on a destination end node specified by the packet's internetwork header. The packet's data link header is modified in accordance with the forwarding decision and the packet is transmitted over an appropriate subnetwork coupled to the intermediate network node.

Figure 2:
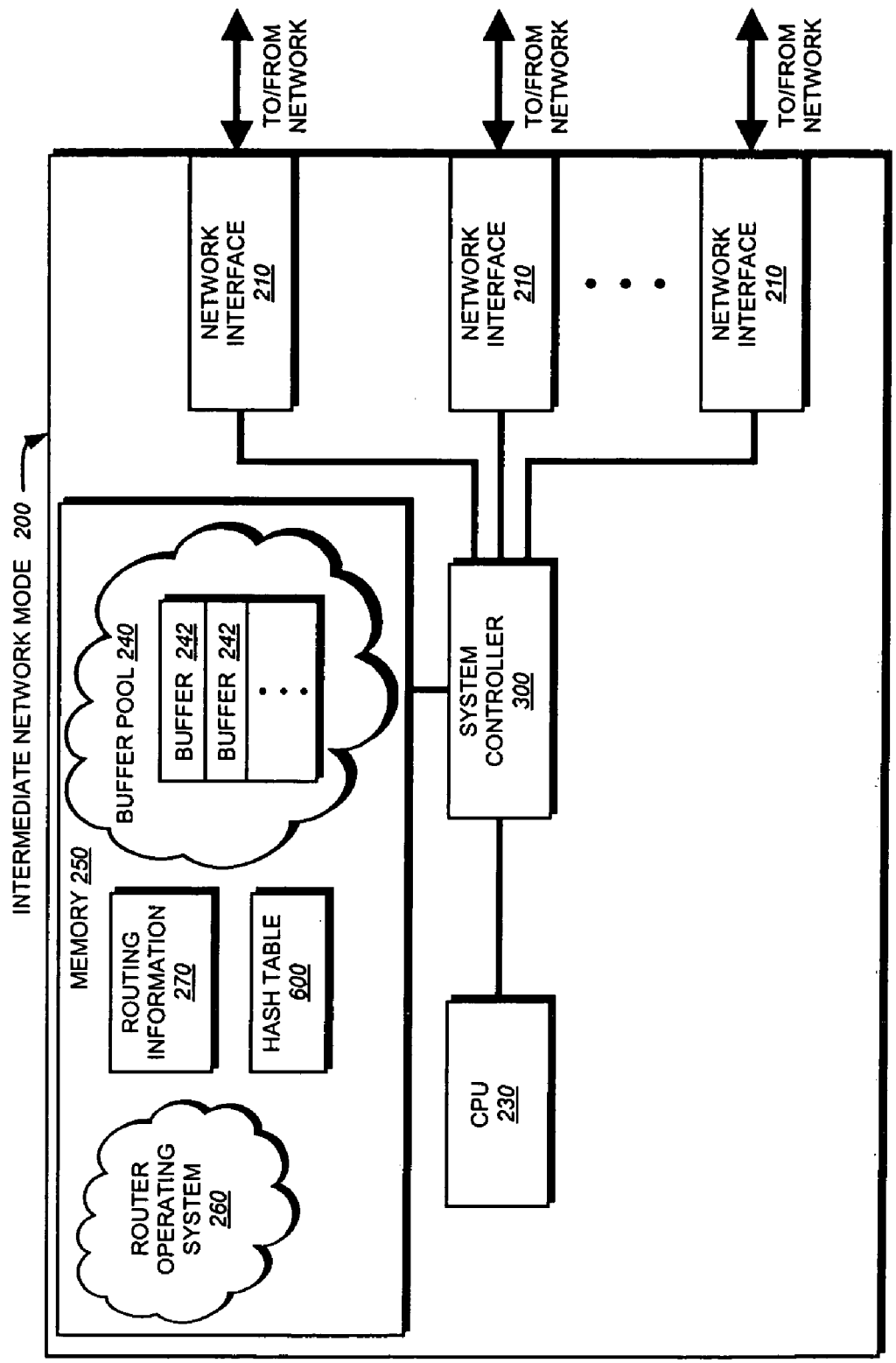
FIG. 2 is a schematic block diagram of an illustrative intermediate network node that may be used in accordance with the present invention.

FIG. 2 is a schematic block diagram of an intermediate node 200 that may be advantageously used with the present invention. The node comprises a plurality of network interfaces 210, a system controller 300, a central processing unit (CPU) 230 and a memory 250. Data is received by the network interfaces 210, each of which is coupled to at least one network or subnetwork, such as LANs 105 and 110. The network interfaces contain the mechanical, electrical and signaling circuitry that enables the intermediate network node 200 to communicate over physical links connected to networks and subnetworks, including, inter alia, asynchronous transfer mode (ATM) networks, synchronous optical networks (SONET), wireless networks, frame relay networks, Ethernet networks, Fiber Distributed Data Interface (FDDI) networks, etc.

The system controller 300 is coupled to each network interface 210, the CPU 230 (i.e., a processor) and the memory 250 by different local buses in the intermediate network node 200. For instance, the system controller may be coupled to the network interfaces 210 by respective peripheral component interconnect (PCI) buses, whereas the controller may be coupled to the memory 250 by a plurality of high-speed connections, such as HyperTransport bus links. The controller 300 therefore functions as a "bridge" for transferring data from one local bus to another. That is, the controller receives data over a first local bus, e.g., coupled to a network interface 210, and converts the data to a format that may be transmitted over a second local bus, e.g., coupled to the memory 250. The system controller may also include other functionality, such as application-specific circuitry or logic. Illustratively, the controller 300 may be embodied in hardware as a field-programmable gate array (FPGA) or an application-specific integrated circuit (ASIC), although the controller's functionality alternatively may be implemented in various combinations of hardware and/or software.

The memory 250 comprises a plurality of storage locations that are addressable by the CPU 230 and the network interfaces 210 via the system controller 300. The memory comprises a form of random access memory (RAM) that is generally cleared by a power cycle or other reboot operation (e.g., it is a "volatile" memory). For instance, the memory 250 may comprise dynamic random access memory (DRAM) and/or synchronous DRAM (SDRAM) storage locations adapted to store program code and data structures accessible to the CPU 230. It will be apparent to those skilled in the art that the memory 250 may also comprise other memory means, including various computer-readable media, for storing program instructions and data structures pertaining to the operation of the intermediate network node 200.

A router operating system 260, portions of which are typically resident in the memory 250 and executed by the CPU 230, functionally organizes the intermediate network node 200 by, inter alia, invoking network operations in support of software processes executing on the intermediate node. The IOS™ operating system by Cisco Systems, Inc. is one example of a router operating system 260. The operating system may perform routing operations on data packets 160 received by the network interfaces 210. A portion of the memory 250 may be organized as a buffer "pool" 240 of data buffers 242 configured to store received data packets. For example, each buffer may be configured to store up to a fixed amount, e.g., 2 kilobytes, of the received data packet 160.

Operationally, a received packet 160 is transferred from a network interface 210 to one or more of the buffers 242. The CPU 230 executing the router operating system 260 renders a forwarding decision for the received packet based on routing information 270 stored in the memory 250. One or more data structures, such as the hash table 600, may be stored in the memory to facilitate the operating system's forwarding decision. For example, the hash table 600 may be used to identify a data flow associated with the received packet, and the routing information 270 may store adjacency information associated with the identified flow. In this case, the packet's network headers are modified in accordance with the adjacency information associated with the packet's identified data flow.

Figure 3:
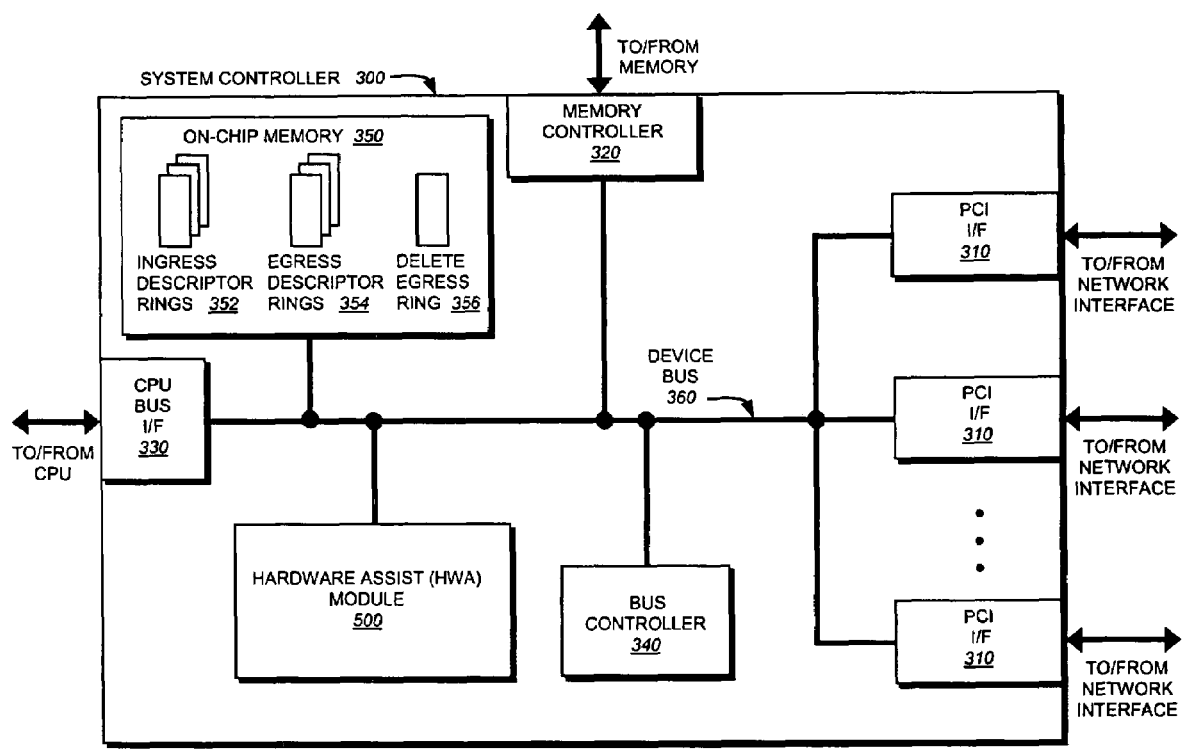
FIG. 3 is a schematic block diagram of a system controller that may be implemented in the illustrative intermediate network node in FIG. 2.

FIG. 3 is a schematic block diagram of the system controller 300 that may be implemented in the illustrative intermediate network node 200. The system controller comprises a plurality of first local bus (PCI) interfaces 310, a memory controller 320, a CPU bus interface 330, a bus controller 340, an on-chip memory 350 and a hardware assist (HWA) module 500 interconnected by a device bus 360. In an illustrative embodiment, each PCI interface 310 includes circuitry and logic configured to send and receive data over a PCI bus coupled to a network interface 210. However, the PCI interfaces 310 alternatively may be substituted by respective controllers that communicate over other types of buses, such as Industry Standard Architecture (ISA) buses, Extended ISA (EISA) buses, etc. Data received at a network interface 210 is forwarded over a PCI bus to a PCI interface 310, which frames the received data so it may be transferred over the device bus 360. Conversely, the PCI interface may receive data from the bus 360 and reformat the data for transmission over the PCI bus.

The memory controller 320 comprises circuitry and logic configured to transfer data from the memory 250 over the second local bus to the device bus 360, and vice versa. For instance, the CPU 230 may forward a memory address (or range of addresses) to the CPU bus interface 330. The memory address may be accompanied by a CPU instruction to read or write data at that memory address. The CPU bus interface 330 transmits the memory address and its corresponding CPU instruction over the device bus 360 to the memory controller 320. In response, the memory controller writes or retrieves data at the specified memory address, in accordance with the CPU instruction.

The bus controller 340 comprises circuitry and logic that, inter alia, implements an arbitration policy for coordinating access to the device bus 360. That is, the controller 340 prevents two or more entities, such as the PCI interfaces 310, memory controller 320, etc., from attempting to access the bus 360 at substantially the same time. To that end, the bus controller 340 may be configured to grant or deny access to the bus 360 based on a predefined arbitration protocol.

According to the illustrative embodiment, one or more functions normally performed by the CPU 230 executing the router operating system 260 may be "off-loaded" to the HWA module 500. For instance, the HWA module may be configured to filter denial-of-service (DoS) packets received at the intermediate network node 200, before the packets can be processed by the CPU. As such, the processing bandwidth of the CPU 230 is not consumed identifying and removing "malicious" DoS traffic, as in previous implementations. Further, as discussed in more detail below, the HWA module is configured to identify DoS packets having arbitrarily complex encapsulations that otherwise can not be identified using traditional techniques, such as TCAMs or lookup tables.

The on-chip memory 350 comprises a set of addressable memory locations resident on the system controller 300. The on-chip memory may be a form of volatile memory, such as static RAM (SRAM), or a form of erasable non-volatile memory, such as Flash memory. Although the illustrative on-chip memory 350 is situated in the system controller 300, it is also expressly contemplated that the on-chip memory may reside in a separate memory module coupled to the system controller, or the contents of the on-chip memory (or a portion thereof) may be incorporated into the "main" memory 250.

The on-chip memory 350 stores, among other things, one or more "ingress" descriptor rings 352 (i.e., circular first-in, first-out (FIFO) queues), one or more "egress" descriptor rings 354 and a "delete" descriptor ring 356. Each network interface 210 is associated with at least one ingress ring 352 in the on-chip memory 350. When packet data is received at a network interface 210, the packet data is forwarded over an appropriate PCI bus, through the system controller 300, to an available data buffer 242 in the memory 250. A memory reference (i.e., a "descriptor") to the data buffer is then enqueued in the ingress descriptor ring 352 associated with the network interface 210 that received the packet data. Packet data is stored and descriptors are enqueued in this manner until the network interface 210 determines that an entire packet 160 has been received or an error has occurred. Accordingly, the network interface's ingress ring 352 stores an ordered list of descriptors corresponding to the order in which the packet data is received at the interface 210.

After the packet 160 has been received, the network interface 210 notifies the HWA module 500 which ingress descriptor ring 352 contains the received packet's descriptors. The HWA module dequeues the descriptors and processes the received packet data to determine the packet's associated data flow. In accordance with the illustrative embodiment, the HWA module performs hash-based flow classification that enables it to classify packets having arbitrarily complex encapsulations. Having identified the packet's associated data flow, the HWA module enqueues the packet's descriptors in an appropriate egress descriptor ring 354, selected based on the identified data flow. The CPU 230 is notified, e.g., by a hardware interrupt, when the packet's descriptors have been enqueued on one of its egress descriptor rings 354. In response, the CPU dequeues the descriptors from its egress descriptor ring and renders a forwarding decision for the received data packet 160.

Illustratively, each of the egress descriptor rings 354 corresponds to a different destination and/or priority level that may be associated with the identified data flow. For instance, among the egress rings 354 may be separate high-priority and low-priority egress descriptor rings, respectively corresponding to high-priority and low-priority data flows processed by the CPU 230. Moreover, in a multi-CPU implementation, a set of one or more high-priority and/or low-priority egress descriptor rings 354 may be associated with each CPU 230 in the plurality of CPUs.

If the HWA module 500 determines that the received data packet 160 is a DoS packet or other type of malicious packet, e.g., based on the packet's identified data flow, the HWA module enqueues the packet's descriptors on the delete egress ring 356 or on a first in, first out queue (not shown) of "free" buffer descriptors, i.e., descriptors whose referenced buffers 242 are available to store new packet data, associated with the network interface 210. Advantageously, descriptors placed on the delete ring 356 or on the free-buffer FIFO are "recycled" (i.e., reused) before they can be forwarded to the CPU 230. As such, the data buffers 242 storing the malicious DoS packet data can be reclaimed by the HWA module 500 without having to consume the CPU's bandwidth or processing resources.

Figure 4:
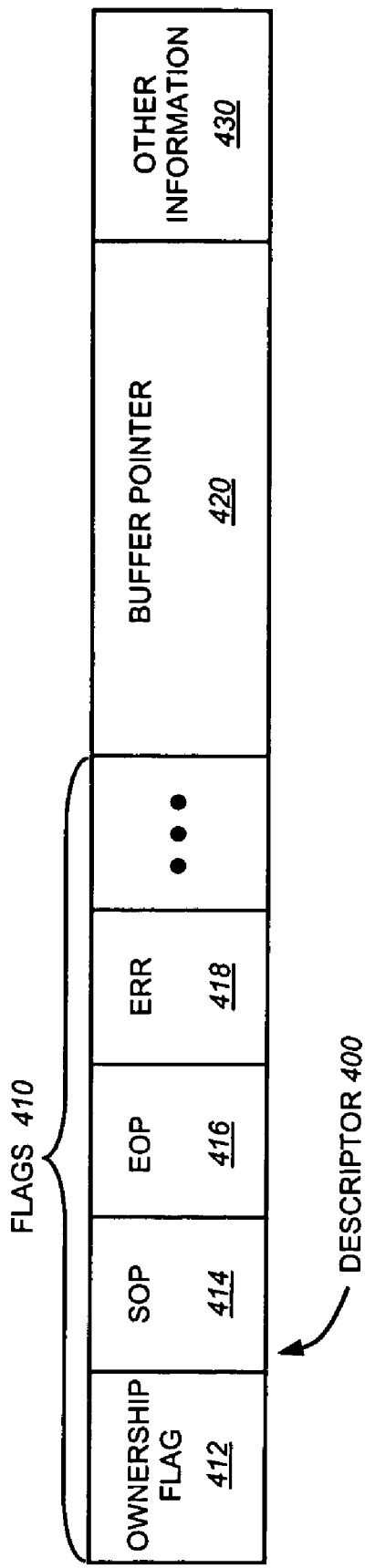
FIG. 4 is a schematic block diagram of an exemplary buffer descriptor that may be enqueued in the ingress and/or egress descriptor rings of the present invention.

FIG. 4 illustrates an exemplary descriptor 400 that may be enqueued in at least one of the ingress and egress descriptor rings 352-356. The descriptor contains, inter alia, a set of flags 410, a buffer pointer 420 as well as other information 430 associated with the descriptor. The flags 410 may include, for example, an ownership flag 412, a start-of-packet (SOP) flag 414, an end-of-packet (EOP) flag 416 and an error (ERR) flag 418. The ownership flag 412 stores a value that indicates which device is granted ownership (i.e., control) of the descriptor 400. For instance, the ownership flag may equal a first value to indicate that a network interface 210 is given exclusive access to the descriptor 400; the flag 412 may equal a second value when control of the descriptor is transferred to the HWA module 500.

The SOP flag 414 may be set equal to a value that indicates whether the descriptor's referenced data buffer 242 contains the start of the received data packet 160. Similarly, the EOP flag 416 may be set equal to a value that indicates whether the descriptor's referenced data buffer contains the end of the packet 160. The ERR flag 418 may be set equal to a value indicating whether an error has been detected in the received packet data, e.g., as a result of a cyclic redundancy check (CRC) or the like. Of course, other flag values besides those explicitly shown may be included in the set of flags 410. For instance, the descriptor 400 may include a flag (not shown) whose value indicates whether or not the descriptor's referenced packet data is part of a new data flow.

The buffer pointer 420 stores a value that indicates the memory location, e.g., in the memory 250, of the descriptor's corresponding data buffer 242. Other status and configuration information 430 also may be included in the descriptor 400 to tailor the descriptor for a particular intermediate-node implementation. For example, the descriptor's other information 430 may include the amount of packet data stored in the descriptor's referenced data buffer 242.

Figure 5:
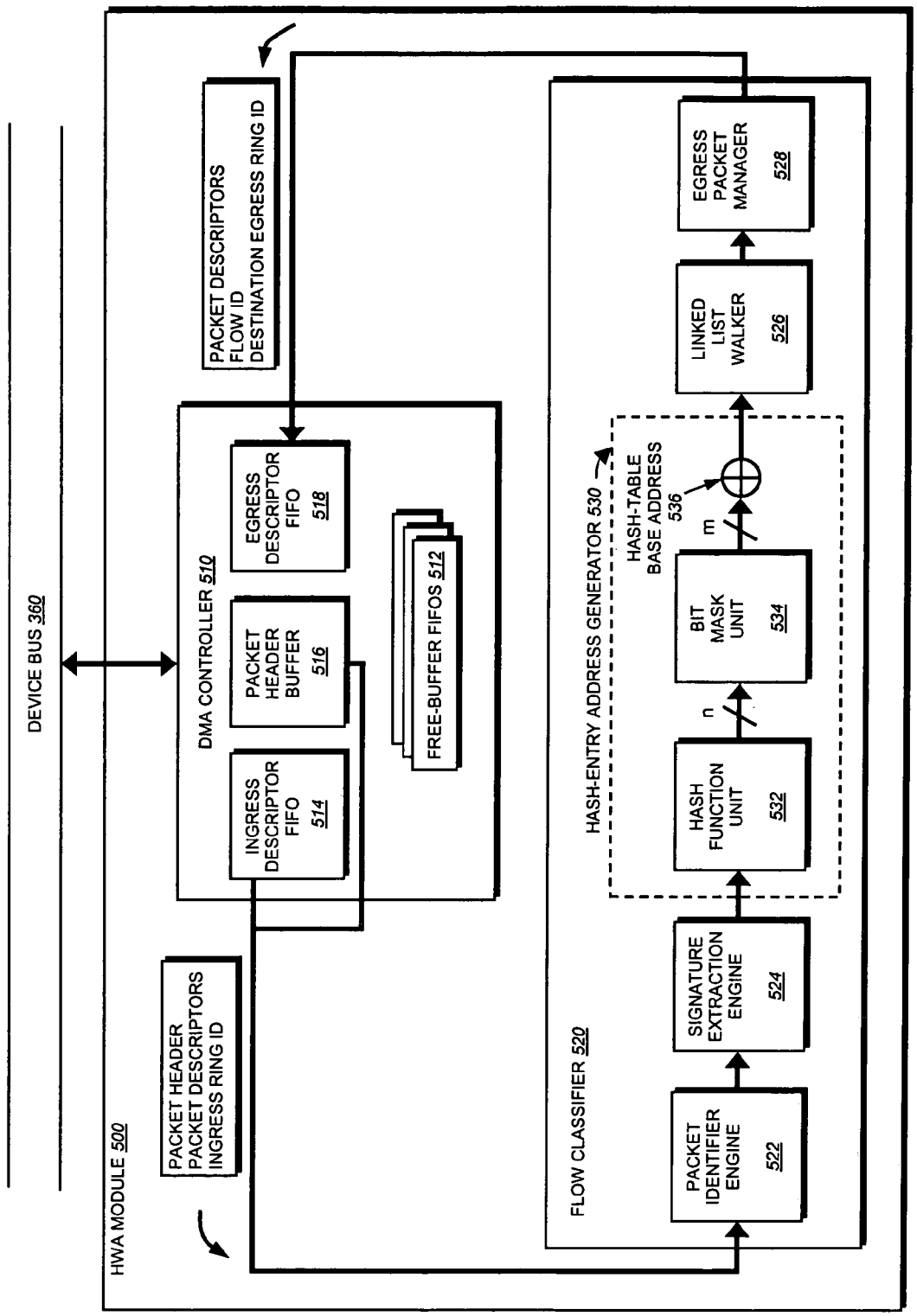
FIG. 5 is a schematic block diagram of an illustrative hardware assist (HWA) module that may be used to automatically identify and remove malicious data packets in accordance with the present invention.

FIG. 5 is a schematic block diagram of the illustrative HWA module 500 which is adapted to filter DoS packets before the packets can be forwarded to the CPU 230. The HWA module 500 includes, among other things, a direct memory access (DMA) controller 510 and a flow classifier 520 that can collectively filter denial-of-service (DoS) traffic received at the intermediate network node 200. More specifically, the DMA controller 510 can access received packet data, e.g., stored in one or more data buffers 242 in the memory 250. The flow classifier 520 uses the received packet data and descriptors to identify a data flow associated with the packet. Unlike previous implementations, if the data flow identified by the flow classifier corresponds to a DoS data flow, then the DMA controller can "drop" (i.e., discard) the DoS packet before it is forwarded to the CPU 230. By filtering the DoS traffic in this manner, the CPU bandwidth and other processing resources are not consumed processing the DoS packets.

The DMA controller 510 includes, inter alia, one or more free-buffer FIFOs 512, an ingress descriptor FIFO 514, a packet-header buffer 516, an egress descriptor FIFO 518. For every network interface 210 coupled to the system controller 300, the DMA controller 510 maintains a separate free-buffer FIFO 512. Each free-buffer FIFO stores a list of free buffer pointers 420 that have been allocated to its associated network interface. The CPU 230 may forward, via device bus 360, a predetermined number of free buffer pointers 420 to the DMA controller for storage in each interface's associated free-buffer FIFO 512. The set of free-buffer pointers allocated to each network interface 210 corresponds to a respective set of data buffers 242 allocated for that interface. The free buffer pointers 420 and their associated flag values 410 may be stored in ingress descriptors 400 which, in turn, may be stored in an ingress descriptor ring 352. As such, the ownership flag values 412 are set equal to values that indicate that the descriptors (and thus their corresponding free buffer pointers) are "owned" by the network interface.

Notably, if the number of free buffer pointers 420 enqueued in a network interface's free-buffer FIFO 512 becomes less than a predetermined "low-water" level, the DMA controller may send an interrupt to the CPU 230 that requests additional free buffer pointers for that interface. The low-water threshold value is preferably programmable and thus tunable for the system performance of the intermediate network node 200. The CPU 230 responds to the interrupt by enqueueing the requested free-buffer pointers in the appropriate free-buffer FIFO 512.

The ingress descriptor FIFO 514 is adapted to store buffer descriptors retrieved from one or more of the ingress descriptor rings 352. Initially, descriptors are enqueued on the interface's ingress descriptor ring(s) 352, until each entry in the ingress descriptor ring contains a free buffer descriptor. Then, as packet data is received at the network interface, the interface forwards the received data to data buffers 242 referenced by the descriptors enqueued at the "head" of its ingress descriptor ring 352. When a data buffer 242 becomes filled, or the end of the packet is received, the network interface 210 modifies the ownership flag value 412 in the buffer's corresponding descriptor so as to transfer ownership of that descriptor to the DMA controller 510. Of course, the interface also may modify other information, such as flag values 410, in the descriptor as well. This process is repeated until the end of the packet has been received, e.g., as indicated by an EOP flag value in the received data packet 160, or an error is detected.

Having received the data packet 160, the network interface 210 sends an interrupt to the DMA controller 510 specifying which ingress descriptor ring 352 stores the packet's descriptors. For instance, each of the ingress rings 352 may be assigned a unique identification (ID) value that may be incorporated into the interrupt. In response to receiving the interrupt, the controller 510 interacts with the device bus 360 to retrieve the packet's descriptors and store the descriptors in the ingress descriptor FIFO 514. Operationally, the DMA controller dequeues descriptors from the ingress ring 352, beginning with the descriptor whose SOP flag 414 value corresponds to the beginning of the data packet 160, until the packet's last descriptor has been dequeued, as indicated by the value of its EOP flag 416 or ERR flag 418. The dequeued descriptors are then re-enqueued into appropriate entries in the ingress descriptor FIFO 514. For every descriptor dequeued from the ingress descriptor ring 352, the DMA controller 510 replaces the dequeued descriptor with a free buffer descriptor containing a free buffer pointer obtained from the network interface's free-buffer FIFO 512.

Additionally, the DMA controller 510 may also retrieve some (or all) of the received packet's header information, i.e., stored in the data buffers 242 referenced by the packet's descriptors. For example, information contained in the packet's data link, inter-network and/or transport layer headers may be retrieved by the controller and stored in the packet header buffer 516. In an illustrative embodiment, one or more selected packet headers are retrieved by the DMA controller in their entirety and stored in the packet header buffer 516.

After retrieving the packet's descriptors and header information, the DMA controller 510 extracts the packet's descriptors from the ingress descriptor FIFO 514, the packet header information from the packet header buffer 516 and the ingress descriptor ring ID value from the received interrupt, and forwards this information to a packet-identifier engine 522 in the flow classifier 520. The packet-identifier engine contains logic and circuitry configured to determine the type of packet 160 received by the network interface, based on the information forwarded from the DMA controller. For instance, based on this information, the engine 552 may determine whether the packet is formatted in accordance with a predetermined network protocol, such as the IGMP or ICMP protocol. Having identified the packet type, the packet-identifier engine further identifies a predetermined set of fields in the packet headers, descriptors and/or ingress ring ID value from which a set of "signature" information may be extracted.

The predetermined set of fields are forwarded from the packet-identifier engine 522 to a signature-extraction engine 524 in the flow classifier 520. The signature-extraction engine is adapted to extract the signature information from the predetermined locations identified by the packet-identifier engine. For example, the signature information extracted by the engine 524 may include, among other things, source or destination TCP port numbers, source or destination IP addresses, protocol identifiers and so forth.

The extracted signature information is then input to a hash-entry address generator 530 in the flow classifier. The hash-entry address generator includes a hash-function unit 532 that applies a predetermined hash function to the received signature information, thereby generating an n-bit resultant hash value. For example, the hash function may be a conventional CRC-32 hash function that generates a 32-bit hash value (i.e., n=32). In alternate embodiments, the hash function unit 532 may be configured to apply other hash functions, such as the Message Digest 5 function, to the signature information.

The hash value generated by the hash-function unit 532 may be forwarded to a bit-mask unit 534 in the address generator 530. The bit-mask unit selects m bits of the n received hash bits. For example, suppose the hash-function unit 532 generates a 32-bit hash value (n=32). In this case, the bit-mask unit 534 may be configured to select eight (m=8) predetermined bits of a 32-bit hash value by ANDing this 32-bit value with a "mask" value equal to 0x0000FF00 (in hexadecimal). The m bits selected by the bit-mask unit may function as a hash-table index that uniquely identifies a specific entry in a hash table having $2^m$ entries. The index may be converted to a memory address of its indexed hash-table entry, e.g., located in the memory 250. For example, assuming each hash-table entry is four bytes wide, the hash-table index times four may be added to the hash table's base memory address 536 to derive the indexed hash-table entry's memory address.

The generated memory address is forwarded from the hash-entry address generator 530 to a linked-list walker 526. The linked-list walker contains circuitry and logic for searching a linked list that begins at the forwarded hash-table entry memory address, until a linked-list entry is located containing the packet's extracted signature information or the end of the list is reached. If a "matching" list entry is found containing the signature information, the linked-list walker extracts packet-related information, such as a data flow ID value and a destination egress ring ID value, from the matching entry. The flow ID value corresponds to the packet's associated data flow and the destination egress ring ID value corresponds to an egress descriptor ring 354 in which the packet's descriptors should be enqueued for further processing. However, in accordance with the illustrative embodiment, if the packet's flow ID value corresponds to a DoS data flow, then the packet's destination egress ring ID value corresponds to the delete ring 356.

In the event that a matching linked-list entry is not found, the linked-list walker 526 may identify the received packet 160 as belonging to a new data flow. In this case, linked-list walker (or another component of the HWA module 500) may modify the contents of one or more of the packet's descriptors to indicate that the received data packet 160 belongs to the new data flow. In addition, the packet's descriptors are associated with a destination egress ring ID value corresponding to a predetermined "miss descriptor" egress ring 354, e.g., in the on-chip memory 350. The miss descriptor egress ring stores descriptors whose referenced packet data has been associated with a new data flow.

The linked-list walker 536 forwards the packet descriptors, flow ID value and destination egress ring ID value to an egress packet manager 528. The egress packet manager is responsible for reformatting the descriptors from an ingress descriptor format to an egress descriptor format, if necessary. That is, the egress packet manager reformats the packet's descriptors if at least some of the ingress and egress descriptor rings 352-356 are configured to store descriptors having different formats. For example, the ingress and egress descriptor formats may include different flag values 410 or other information 430. The egress packet manager 528 then transfers the packet descriptors, flow ID value and destination egress ring ID value to an egress descriptor FIFO 518 in the DMA controller 510.

When the DMA controller 510 identifies that the packet descriptors have been enqueued in the egress descriptor FIFO 518, the DMA controller forwards the descriptors and their associated flow ID value, via the device bus 360, to the egress descriptor ring 356 corresponding to the descriptors' associated destination egress ring ID value. The DMA controller then sends the CPU 230 an interrupt indicating on which egress descriptor ring the descriptors are enqueued. Then, the CPU dequeues the packet descriptors from the appropriate destination egress ring 354 and renders a forwarding decision for the packet 160, in accordance with its identified data flow.

When the CPU dequeues descriptors from the miss descriptor egress ring 354, the descriptors' referenced packet data is processed by the CPU as a new data flow, and a new linked-list entry 650 may be added for the data flow at an appropriate location in the hash-table 600.

If the DMA controller identifies that the destination egress ring ID value associated with the packet descriptors corresponds to the delete egress ring 356, the DMA controller "recycles" the descriptors by removing the buffer pointers 420 within these descriptors and adding the removed buffer pointers to the free-buffer FIFO 512. In this case, the packet 160 has been identified as belonging to a malicious data flow, such as a DoS data flow, and its associated buffer pointers are returned to the network interface's pool of free buffer pointers rather than forwarding the packet's descriptors to the CPU 230. As such, CPU bandwidth and processing resources are not consumed processing the received DoS packet 160.

If the destination egress ring ID value corresponds to the delete egress ring 356 and there are not enough available entries in the free-buffer FIFO 512 to store the packet's buffer pointers 420, e.g., the CPU 230 has recently filled the FIFO 512 with free buffer pointers, then the packet's descriptors instead may be stored directly in the delete egress ring 356. As such, the delete egress ring 356 serves as an "overflow" queue for the free-buffer FIFO 512, thereby preventing possible stalling on the egress data path while the DMA controller waits for new entries to become available in the FIFO 512. Buffer pointers stored in descriptors enqueued on the delete egress ring 356 later may be transferred to the appropriate free-buffer FIFO 512. For instance, the CPU 230 may dequeue descriptors from the delete egress ring 356 when entries become available in the free-buffer FIFO 512. In this case, the buffer pointers 420 in the dequeued descriptors then may be "recycled" by the CPU by enqueueing the buffer pointers on the free-buffer FIFO. Alternatively, the DMA controller 510 may transfer the descriptors from the delete egress ring to the free-buffer FIFO as entries become available in the FIFO.

Figure 6:
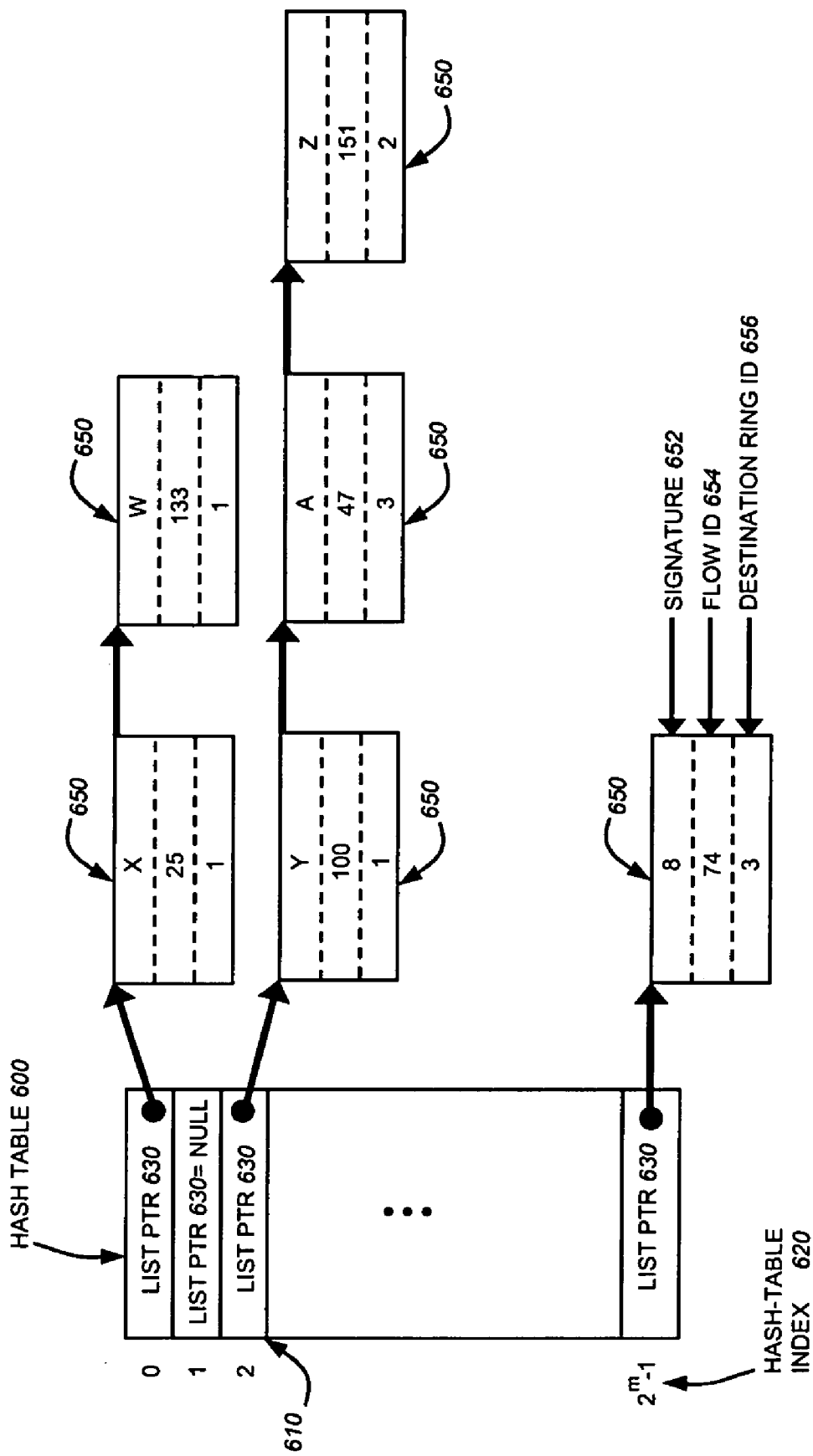
FIG. 6 is a schematic block diagram of an exemplary hash table that may be searched by the HWA module for identifying a data flow associated with a received data packet.

FIG. 6 is a schematic block diagram of the hash table 600 configured to store a plurality of linked lists which may be searched by the linked-list walker 526. The hash table contains $2^m$ hash-table entries 610, each of which is associated with a unique hash-table index 620 and is configured to store a list pointer value 630 referencing the memory location, e.g., in the memory 250, of a corresponding linked list. Alternatively, rather than store list pointer values 630, the hash-table entries instead may be configured to directly store the first entry of their referenced linked lists. A hash-table entry's list pointer value 630 may equal a predetermined "NULL" value if its referenced list does not contain any list entries 600, i.e., its referenced linked list is "empty."

On the other hand, each "non-empty" linked list includes one or more entries 650 which store, inter alia, signature information 652 as well as a flow ID value 654 and a destination egress ring ID value 656. Each destination egress ring ID value corresponds to a respective one of the egress descriptor rings 354-356 in the on-chip memory 350. More specifically, a predetermined destination egress ring ID value 656 (e.g., "3") corresponds to the delete egress ring 356 and the remaining destination egress ring ID values (e.g., "1" and "2") correspond to respective egress descriptor rings 354. In operation, the linked-list walker 526 locates a linked list in the hash table 600 using the list pointer 630 contained in the hash-table entry 610 whose memory address was generated by the hash-entry address generator 530. Then, the linked-list walker sequentially traverses ("walks") the list's linked-list entries 650 until it identifies a matching entry that contains the packet's signature information 652 or until the end of the list is reached.

Figure 7A:
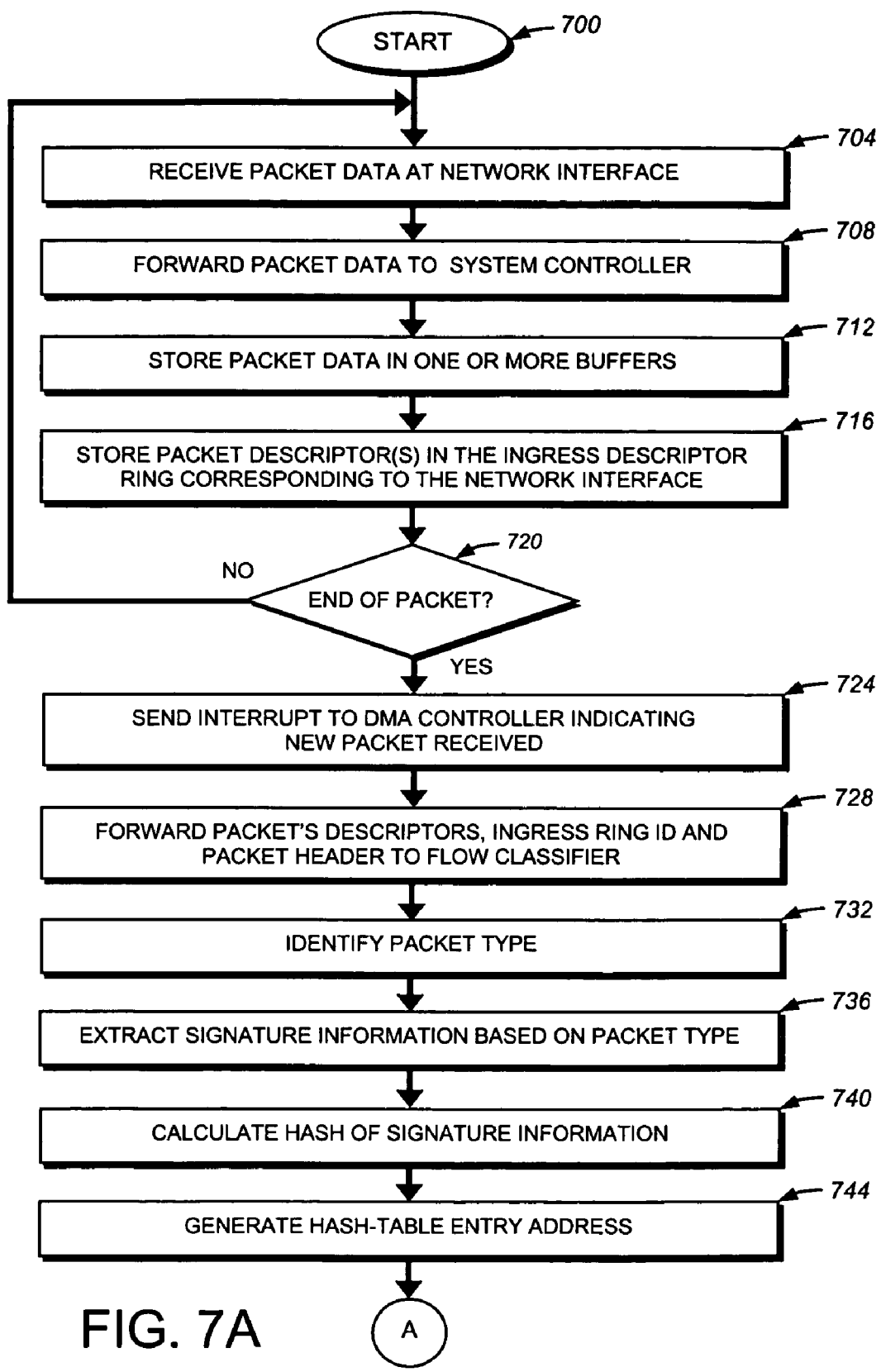
FIGS. 7A-B are a flow chart illustrating a sequence of steps that may be performed for automatically identifying and removing malicious data packets in accordance with the present invention.
Figure 7B:
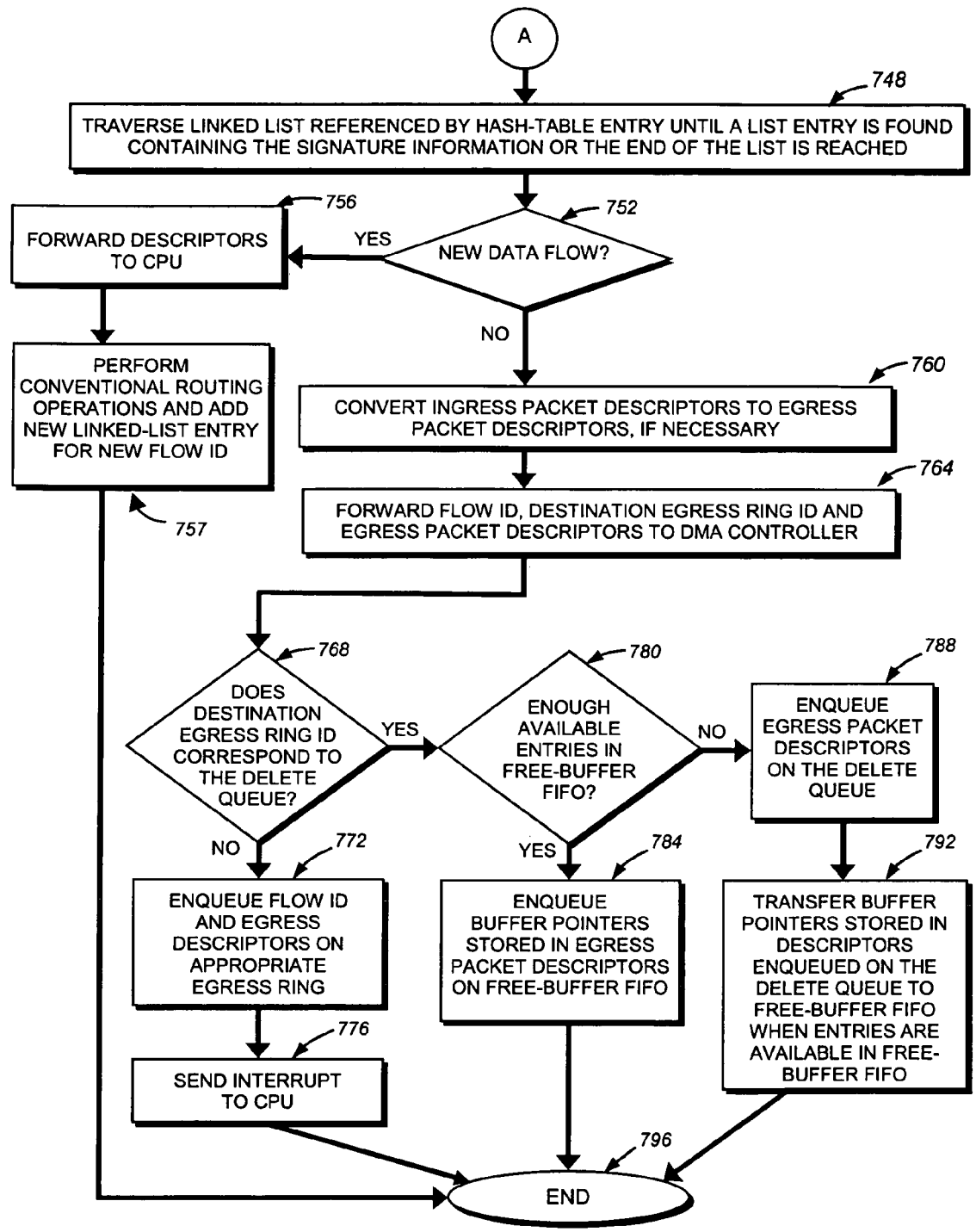

FIG. 7 is a flow chart illustrating a sequence of steps that may be performed in the intermediate network node 200 for identifying DoS packets before they can be forwarded to the CPU 230. The sequence starts at step 700 and proceeds to step 704 where a packet data is received at a network interface 210. At step 708, the packet data is forwarded to the system controller 300, which in turn forwards the packet data to one or more buffers 242 in the memory 250, at step 712. At step 716, the network interface enqueues packet descriptors corresponding to the data buffers 242 storing the received packet data in an ingress descriptor ring 352 associated with the interface.

At step 720 the network interface 210 determines whether the end of the packet 160 has been received. If the end of the packet has not been received, the sequence returns to step 704. Otherwise, at step 724, the network interface 210 sends an interrupt to the DMA controller 510 in the HWA module 500. The interrupt includes, among other things, an ingress descriptor ring ID value that indicates which ingress descriptor ring 352 stores the received packet's descriptors. In response to receiving the interrupt, the DMA controller retrieves the packet's descriptors from the ingress descriptor ring. Notably, upon dequeueing descriptors from the ingress descriptor ring, the DMA controller 510 replaces the dequeued descriptors with free buffer descriptors acquired from a free-buffer FIFO 512 associated with the network interface that received the packet. The DMA controller also retrieves one or more of the received packet's headers, such as its data link, internetwork or transport layer headers. At step 728, the DMA controller 510 forwards the packet's descriptors, header data and the ingress descriptor ring ID value to a flow classifier 520 in the HWA module 500.

At step 732, a packet-identifier engine 522 in the flow classifier identifies the type of data packet 160 received at the network interface 210. At step 736, signature information is extracted from a predetermined set of fields in the packet's descriptors and headers, based on the identified packet type. For example, the signature information may include TCP port number, IP addresses, protocol versions and so forth. At step 740, the extracted signature information is forwarded to a hash-entry address generator 530, in which a hash-function unit 532 calculates a hash of the signature information, e.g., using a CRC 32 hash function or the like. The hash of the signature information is used to create an index in the hash table 600. At step 744, the index may be added to a hash-table base address 536 to generate the memory address, e.g., in the memory 250, of a hash-table entry 610.

At step 748, the generated hash-entry address is forwarded to a linked-list walker 526 which traverses a linked list referenced by a list pointer 630 stored in the indexed hash-table entry 610. The list is searched until a matching list entry 650 is found containing the packet's extracted signature information 652 or the end of the list is reached. At step 752, the linked-list walker determines whether the received data packet 160 corresponds to a new data flow, i.e., the end of the list is reached without finding a matching linked-list entry 650. If the received packet is determined to belong to a new data flow, then, at step 756, the packet's descriptors are returned to the DMA controller 510 which forwards the descriptors to the CPU 230 for processing. At step 757, the CPU performs conventional routing operations for the received packet 160 in accordance with the router operating system 260. In this case, the CPU 230 executing the router operating system may add a new linked-list entry 650 to the hash table 600 corresponding to the new data flow. The added linked-list entry may specify a new flow ID value 654 that has been assigned to the flow by the operating system 260.

On the other hand, if at step 748 a linked-list entry with a matching signature is located, the linked-list walker 526 identifies a flow ID value 654 and a destination egress ring ID value 656 stored at predetermined locations in the matching list entry 650. The linked-list walker then forwards the packet's descriptors to an egress packet manager 528 in the flow classifier 520 which reformats the descriptors, if necessary. Next, at step 764, the egress packet manager forwards the packet's descriptors, flow ID value and destination egress ring ID value to an egress descriptor FIFO 518 in the DMA controller 510.

At step 768, after the descriptors, flow ID value and destination egress ring ID value have been enqueued in the egress descriptor FIFO 518, the DMA controller determines whether the destination egress ring ID value corresponds to the delete queue 356. If it does not, then at step 772, the controller 510 enqueues the packet's flow ID value 654 and descriptors on the destination egress ring 354 corresponding to the destination egress ring ID value 656. Then, at step 776, the DMA controller sends an interrupt to the CPU 230 to notify the CPU that the packet's descriptors and flow ID value have been enqueued on the egress descriptor ring 354. The sequence ends at step 796.

If, at step 768, the packet's associated destination egress ring ID value 656 corresponds to the delete queue 356, then at step 780, the DMA controller 510 determines whether there are enough available entries in the network interface's free-buffer FIFO 512 to store the buffer pointers 420 in the packet's descriptors. If so, the buffer pointers are removed from the descriptors and are enqueued on the free-buffer FIFO 512, at step 784; the sequence ends at step 796. In contrast, if there are not enough available entries in the free-buffer FIFO 512 at step 780, then the DMA controller 510 enqueues the descriptors on the delete queue 356, at step 788. The descriptors remain on the delete queue until their contained buffer pointers 420 can be transferred to the free-buffer FIFO, e.g., when entries become available in the FIFO, at step 792. The CPU 230 executing the router operating system 260 may be responsible for dequeueing the descriptors from the delete queue 356 and transferring their buffer pointers to the free-buffer FIFO 512. However, those skilled in the art will appreciate that other hardware and/or software mechanisms may be used for this purpose. The sequence ends at step 796.

The foregoing has been a detailed description of illustrative embodiments of the invention. Various modifications and additions can be made without departing from the spirit and scope of the invention. For example, the novel technique for filtering malicious packets, such as DoS packets, may be implemented in other network nodes besides intermediate network nodes. Further, the invention may be used in conjunction with conventional access control lists (ACL) and intrusion detection systems (IDS) to provide enhanced security against, e.g., DoS and DDoS attacks. More specifically, the flexibility of the hash-based flow classification described herein enables detection of complex packet encapsulations that can not be detected using traditional ACL or IDS approaches. Thus, arbitrarily complex sets of signature information 652 can be stored in linked-list entries 650 whose associated data flows have been identified as malicious data flows. Identification of the malicious data flows may be determined manually, e.g., by a system administrator, and/or automatically, e.g., by the CPU 230 executing the router operating system 260.

While the illustrative embodiments describe the ingress and egress descriptor rings 352-356 located in the on-chip memory 350, those skilled in the art will appreciate that these descriptor rings alternatively may be stored in other memories in (or coupled to) the intermediate network node 200. In addition, although each network interface 210 is described having a corresponding ingress descriptor ring 352, it is also expressly contemplated that a network interface may be associated with more than one ingress descriptor ring, e.g., having different priority levels. Similarly, while each destination, such as the CPU 230, in the intermediate network node 200 is described having a corresponding egress descriptor ring 354, it is also expressly contemplated that a single destination in the node 200 may be associated with multiple egress descriptor rings, e.g., having different priority levels.

It is also noted that the signature information 652 associated with a received packet 160 is not limited to those values stored in fields of the packet's headers, e.g., and may be extracted from other portions of the packet's contents or other relevant packet information, such as which interface 210 received the packet. As described, the packet's extracted signature is compared with signature information 652 stored in the linked-list entries 650 until a matching list entry is located. However, it is also contemplated that the linked-list entries alternatively may store the result of hashing the signature information 652. In this case, a matching list entry is identified if its contained signature information 652 equals the result of hashing the packet's extracted signature information.

Although the inventive technique is described in terms of a single hash table 600, the technique is equally applicable for a plurality of different hash tables that are each configured as set forth in the illustrative embodiment. For instance, a separate hash table 600 may be associated with each network interface 210 in the intermediate network node 200. As such, packets received at a particular network interface may be routed in accordance with flow ID values 654 stored in that network interface's associated hash table. Moreover, the hash table 600 may be replaced by a different searchable data structure, such as a search tree or the like, configured to store packets' signature information 652, flow ID values 654 and destination egress ring ID values 656. In such an embodiment, the linked-list walker 526 is replaced with a search module that is adapted to search the searchable data structure.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for a network node, which includes a central processing unit (CPU) configured to execute a router operating system, to filter malicious data packets received at the network node, the method comprising:

receiving a data packet at the network node;

performing hash-based flow classification on the received data packet to determine whether the received data packet is a malicious data packet; and discarding, by a hardware assist (HWA) module of a system controller that is coupled to the CPU, the received data packet before the data packet can be forwarded to the CPU for processing by the router operating system, if the received data packet is determined to be a malicious data packet.

2. The method of claim 1, wherein the step of performing hash-based flow classification further comprises:
identifying a packet type associated with the received data packet;
extracting a set of signature information corresponding to the identified packet type; and
searching a hash table to locate the extracted set of signature information.

3. The method of claim 2, further comprising:
configuring the hash table, either manually or automatically, to associate the set of signature information with a data flow; and
determining whether the data flow associated with the set of signature information corresponds to a malicious data flow.

4. The method of claim 1, further comprising:
associating the received data packet with a destination in the network node as a result of the hash-based flow classification.

5. The method of claim 4, further comprising:
determining whether the destination associated with the received data packet is a predetermined destination associated with malicious data packets.

6. The method of claim 5, further comprising:
in response to determining that the destination associated with the received data packet is the predetermined destination, performing the steps of:
removing buffer pointers from a set of descriptors associated with the received data packet; and
storing the removed buffer pointers on a queue of free buffer pointers.

7. The method of claim 6, further comprising:
if the queue of free buffer pointers does not contain enough available entries to store the removed buffer pointers, storing the set of descriptors associated with the received data packet on a delete queue until enough entries become available in the queue of free buffer pointers.

8. The method of claim 6, further comprising:
transferring free buffer pointers from the router operating system to the queue of free buffer pointers.

9. The method of claim 1, wherein the step of performing hash-based flow classification is used in conjunction with an access control list or an intrusion detection system.

10. The method of claim 1, wherein the network node is an intermediate network node.

11. A network node, comprising:
a central processing unit (CPU) configured to execute instructions that implement a router operating system;
a network interface adapted to receive a data packet;
a memory having a plurality of storage locations addressable by the CPU, the storage locations being configured to store:
(i) at least a portion of the router operating system instructions,
(ii) one or more data buffers for storing the received data packet, and
(iii) a searchable data structure configured to store information associated with the received data packet; and
a system controller coupled to the memory and the CPU, the system controller including a hardware assist (HWA) module configured to discard malicious data packets from the network node before the malicious data packets can be forwarded to the CPU for processing by the router operating system.

12. The network node of claim 11, wherein the searchable data structure is a hash table.

13. The network node of claim 11, wherein the HWA module includes a direct memory access (DMA) controller and a flow classifier.

14. The network node of claim 13, wherein the DMA controller includes:
an ingress descriptor first in, first out (FIFO) queue configured to store a set of descriptors referencing the one or more data buffers in which the received data packet is stored;
a packet-header buffer configured to store information contained in at least one packet header prepended to the received data packet;
an egress descriptor FIFO configured to store the set of descriptors as well as a data flow identification (ID) value for identifying the data flow associated with the received data packet and a destination value for identifying a destination in the network node associated with the received data packet, the flow classifier searching the searchable data structure to locate the data flow ID value and the destination value; and
a free-buffer FIFO containing a set of free buffer descriptors allocated for the network interface.

15. The network node of claim 13, wherein the flow classifier includes:
a packet-identifier engine configured to identify a packet type associated with the received data packet based on information received from the DMA controller;
a signature-extraction engine configured to extract a set of signature information from a predetermined set of fields in the information received from the DMA controller, the predetermined set of fields being selected based on the packet type identified by the packet-identifier engine;
an address generator configured to generate a memory address based on the set of signature information, the memory address corresponding to an entry in the searchable data structure; and
a search module configured to search the searchable data structure to locate a flow ID value and a destination value associated with the received data packet.

16. The network node of claim 15, wherein the flow classifier further includes
an egress packet manager configured to reformat descriptors from an ingress descriptor format to an egress descriptor format.

17. The network node of claim 11, wherein the network node is an intermediate network node.

18. A network node including a central processing unit (CPU) configured to execute a router operating system, the network node comprising:
means for receiving a data packet at the network node;
means for performing hash-based flow classification on the received data packet to determine whether the received data packet is a malicious data packet; and
means for discarding, at a hardware assist (HWA) module of a system controller that is coupled to the CPU, the received data packet before the data packet can be forwarded to the CPU for processing by the router operating system, if the received data packet is determined to be a malicious data packet.

19. A computer-readable media including instructions for execution by a processor, the instructions for a method of filtering malicious data packets received at a network node in which a central processing unit (CPU) is configured to execute a router operating system, the method comprising:

receiving a data packet at the network node;

performing hash-based flow classification on the received data packet to determine whether the received data packet is a malicious data packet; and discarding, by a hardware assist (HWA) module of a system controller that is coupled to the CPU, the received data packet before the data packet can be forwarded to the CPU for processing by the router operating system, if the received data packet is determined to be a malicious data packet.

20. A method comprising:

receiving a data packet;

storing the data packet in one or more data buffers referenced by a set of one or more packet descriptors;

passing the set of packet descriptors to an ingress descriptor queue at a direct memory access (DMA) controller;

performing, by a flow classifier coupled of the DMA controller, hash-based flow classification on the data packet referenced by the set of packet descriptors to associate the data packet with a particular data flow identification (ID) value;

passing the set of packet descriptors to an egress descriptor queue; and determining based on the data flow ID value if the data packet is a malicious data packet and, if so, freeing the set of packet descriptors to discard the data packet before the data packet can be processed by a router operating system operating on a CPU coupled to the DMA controller and, if not, allowing the data packet to be processed by the router is operating system operating on the CPU coupled to the DMA controller.

21. The method of claim 20 wherein freeing the set of packet descriptors comprises:

removing buffer pointers from the set of packet descriptors and placing the buffer pointers on a free-buffer queue.

22. The method of claim 21, further comprising:

if the free-buffer queue has insufficient space to store additional removed buffer pointers, storing the set of descriptors in a delete queue until space becomes available in the free-buffer queue.

23. The method of claim 20 wherein allowing the data packet to be processed comprises:

sending an interrupt to the CPU to notify the CPU that the set of packet descriptors are available in the egress queue.

24. The method of claim 20, wherein performing hash-based flow classification comprises:

identifying a packet type associated with the data packet;

extracting a set of signature information corresponding to the identified packet type; and searching a hash table to locate the extracted set of signature information and accessing one or more associated entries.

25. The method of claim 20 further comprising:

reformatting the set of packet descriptors from an ingress descriptor format to an egress descriptor format before passing the set of packet descriptors to the egress descriptor queue.

* * * * *

UNITED STATES PATENT AND TRADEMARK OFFICE
CERTIFICATE OF CORRECTION

| | | |
|---|---|---|
| PATENT NO. | : 7,411,957 B2 | Page 1 of 1 |
| APPLICATION NO. | : 10/811195 | |
| DATED | : August 12, 2008 | |
| INVENTOR(S) | : John Kenneth Stacy | |

It is certified that error appears in the above-identified patent and that said Letters Patent is hereby corrected as shown below:

Col. 20, Line 1, replace "router is operating" with "router operating"

Signed and Sealed this
Fifth Day of April, 2011

David J. Kappos
*Director of the United States Patent and Trademark Office*